E. G. HILL.
SPRING WHEEL.
APPLICATION FILED OCT. 23, 1917.

1,256,018.

Patented Feb. 12, 1918.

Witness
R. E. Rousseau

Inventor
Ernest G. Hill.

By Munn & Co.

Attorneys

UNITED STATES PATENT OFFICE.

ERNEST G. HILL, OF SPOKANE, WASHINGTON.

SPRING-WHEEL.

1,256,018. Specification of Letters Patent. Patented Feb. 12, 1918.

Application filed October 23, 1917. Serial No. 198,079.

*To all whom it may concern:*

Be it known that I, ERNEST G. HILL, a citizen of the United States, and a resident of Spokane, in the county of Spokane and State of Washington, have invented certain new and useful Improvements in Spring-Wheels, of which the following is a specification.

My invention is an improvement in spring wheels, and has for its object to provide a wheel of the character specified, which will give the resiliency of a pneumatic tire without the danger of punctures, blow-outs and the like.

Figure 1:
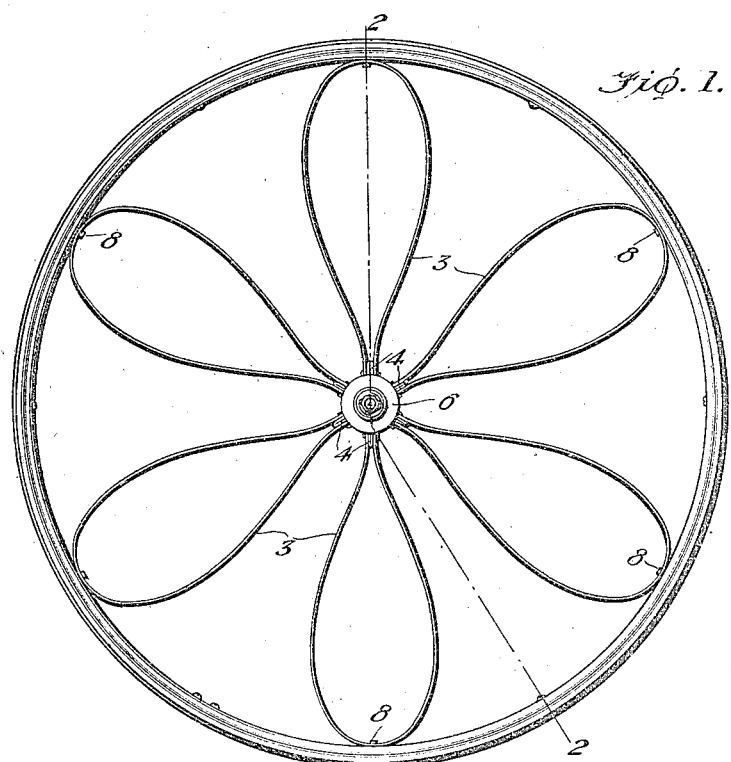
Figure 1 is a side view of the improved wheel.
Figure 2:
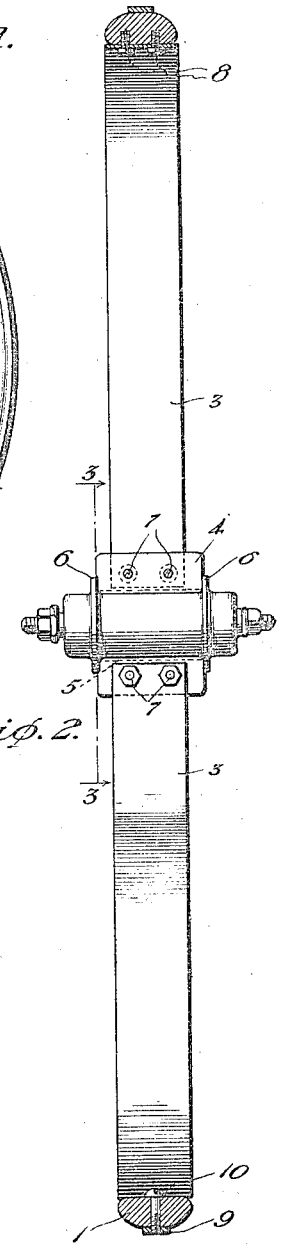
Fig. 2 is a section on the line 2—2 of Fig. 1.
Figure 3:
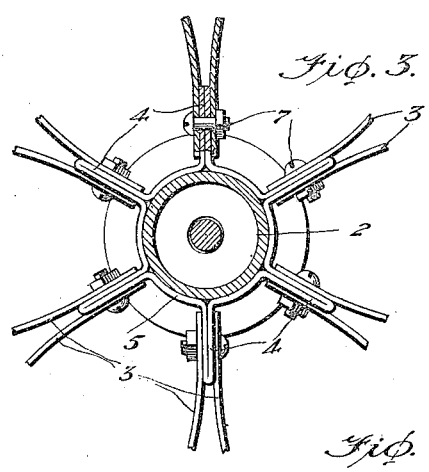
Fig. 3 is a section on the line 3—3 of Fig. 2, looking in the direction of the arrows adjacent the line.

In the present embodiment of the invention, a rim 1 is provided, of suitable size and cross section and continuous, and this rim is connected to a hub 2 by resilient spokes 3. Each of the spokes 3 is formed from a strip of suitable material bent in substantially elliptical shape, and the body portion of each strip, that is, the intermediate portion, is connected to the rim at the inner face thereof.

The ends of the strips are secured to outwardly extending lugs 4 on a ring 5 which encircles the hub, between the end flanges 6 thereof. This ring 5 is formed from a strip of metal which is bent in such manner as to form radial lugs 4 at spaced intervals, and the ends of the strips which form the spokes 3 are connected to these lugs by screw bolts and nuts 7. The ends of the strips are lapped upon the opposite sides of the lugs, and the bolts are passed through registering openings in the said ends and in the lugs. The intermediate portions of the strips forming the spokes which engage the rims are secured thereto by screws 8.

Figure 4:
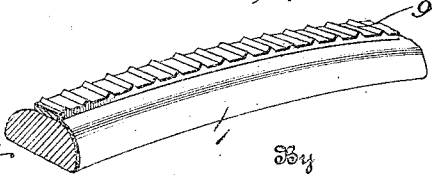
Fig. 4 is a perspective view of a portion of the tread.

A suitable tread 9 may be secured to the outer face of the rim, by means of screws 10, which are passed through the rim from the inner side into engagement with the tread, and this tread may be corrugated or toothed, as shown in Fig. 4, to prevent slipping of the wheel. The arrangement of the spokes is such that should for any reason it be necessary to take out a spoke it can be easily done, merely by removing the screws 8 and the bolts and nuts 7. The spokes may be of light or heavy weight, as may be desired. For instance, with bicycles the spokes may be light, while for trucks heavy spokes will be used. The tread 9 is preferably of steel and it will be evident that when this tread becomes worn it may be easily removed and replaced.

In use, when the hub moves eccentrically of the wheel the arms of the spokes at one side of the hub will move outwardly, lengthening the short axis of the ellipse, while those at the other side will move toward each other, shortening the short axis, and the spokes both above and below, as well as those at each side, will assist in this cushioning movement of the hub with respect to the rim.

I claim:

A spring wheel comprising a hub and a rim, resilient spokes connecting the hub and the rim, each spoke being formed from a strip of metal bent upon itself into substantially elliptical form and with the intermediate portion of the strip connected to the rim, the ends of the strip being connected to the hub, the connection at the hub comprising a strip encircling the hub and having outwardly bent portions forming radial lugs to which the ends of the strips forming the spokes are connected, the ends of the last named strip forming one of the lugs.

ERNEST G. HILL.

Witnesses:
CARL W. SWANSON.
P. E. ERICKSON.